United States Patent [19]

Gallup et al.

[11] Patent Number: 5,256,301
[45] Date of Patent: Oct. 26, 1993

[54] CONTROL OF SALT PRECIPITATION FROM GEOTHERMAL BRINE

[75] Inventors: Darrell L. Gallup, Chino Hills; Manuel E. Obando, Whittier, both of Calif.

[73] Assignee: Union Oil Company of California, Los Angeles, Calif.

[21] Appl. No.: 861,529

[22] Filed: Mar. 31, 1992

[51] Int. Cl.$^5$ .............................................. C02F 1/72
[52] U.S. Cl. ................................... 210/696; 60/641.2; 60/641.5; 166/267; 210/747; 210/758
[58] Field of Search ............................ 60/641.2, 641.5; 166/267; 210/696, 718, 721, 724, 747, 750, 758

[56] References Cited

U.S. PATENT DOCUMENTS

| | | | |
|---|---|---|---|
| 4,522,728 | 6/1985 | Gallup et al. | 60/641.5 |
| 4,615,808 | 10/1986 | Gallup et al. | 210/747 |
| 4,844,162 | 7/1989 | Maassen et al. | 60/641.2 |
| 4,869,066 | 9/1989 | Pye et al. | 210/747 |
| 4,967,559 | 11/1990 | Johnston | 210/747 |
| 4,978,457 | 12/1990 | Gallup et al. | 210/747 |
| 5,028,340 | 7/1991 | Gallup | 210/747 |
| 5,098,578 | 3/1992 | Gallup et al. | 210/747 |

*Primary Examiner*—Peter Hruskoci
*Attorney, Agent, or Firm*—Gregory F. Wirzbicki; Charles L. Hartman

[57] ABSTRACT

Soluble salts are prevented from precipitating from a brine concentrate produced from the flashing a geothermal brine by diluting the brine concentrate with preconditioned condensate. The pH of the condensate is first adjusted to within two pH units of brine concentrate. Then concentration of sulfide ion is reduced by oxidizing sulfide to sulfate by exposure to air for a period of time sufficient to oxidize a substantial portion of the sulfide, but short enough to prevent a substantial concentration of oxygen from dissolving in the condensate. The preconditioned condensate is then mixed with the brine concentrate to form an injection stream. The injection stream is then injected into the earth.

24 Claims, No Drawings

CONTROL OF SALT PRECIPITATION FROM GEOTHERMAL BRINE

BACKGROUND OF THE INVENTION

1. Field of the Invention

This invention relates to methods of controlling solids precipitation from geothermal brines, particularly to methods of preventing precipitation of soluble salts from supersaturated brine concentrates remaining after flashing the brine.

2. State of the Art

When extracted from the earth, hot aqueous geothermal brines contain many dissolved solids. Geothermal brines produce steam used to generate power after flashing, that is, reducing the temperature and pressure rapidly to produce steam and a brine concentrate. The rapid temperature reduction caused by flashing forces many dissolved solids in the brine to precipitate out of brine concentrate. Usually, the solids that precipitate from the brine concentrate are either sparingly soluble or virtually insoluble at standard temperature and pressure (STP, herein 20° C. and one atmosphere). These sparingly soluble or insoluble solids tend to produce the bulk of the scale normally precipitated in geothermal operations.

However, salts that are normally considered to be quite soluble have recently started to cause precipitation problems as well. Some geothermal brines have recently been producing brine concentrates that have an increased concentration of dissolved salts. This phenomenon is particularly noticeable in brine produced from older formations. The salt concentration of, for example, chloride salts of sodium, potassium, and magnesium, may become supersaturated as the brine concentrate cools, causing the salts to precipitate. The pipes and other equipment in the geothermal facility then become caked not only with a refractory scale from the insoluble salts, but also from normally soluble salts as well.

Since precipitation of solids from aqueous solution is a result of exceeding a critical concentration, salt precipitation from the brine concentrate can be prevented by diluting the salt concentration by adding more water. If enough water can be obtained, this method works well. However, many geothermal resources are found in semi-arid or arid regions where fresh water is scarce, precluding its use for diluting geothermal brines. However, the liquid that condenses from steam used to generate power, usually referred to as condensate, provides another convenient source of fresh water for the operator of geothermal plants. Condensate is then a candidate for diluting the brine concentrate remaining after flashing.

If water, whatever its source, is added to the brine concentrate, the added water must not change the conditions of the brine concentrate so much that the entire brine treatment system must be overhauled. The systems in place are the result of exhaustive testing and optimization. They are therefore sensitive to the smallest change, which upsets the system. Water condensed from geothermal steam contains problem-causing impurities that flash from the brine with the steam. These problem-causing impurities limit the use of condensate as a diluant.

Both ammonia and hydrogen sulfide flash with water under reduced temperature and pressure. Thus when the flashed geothermal steam ultimately condenses, the liquid condensate tends to contain significant concentrations of ammonium sulfide. The pH of the ammonium sulfide-containing condensate causes a problem. The steam condensate is alkaline, especially compared to the acidic pH of the brine concentrate. The high pH of the condensate causes system upsets by precipitating pH sensitive components. One solution to the pH incompatibility problem, discussed at length in U.S. Pat. No. 4,978,457, issued to Gallup et al., hereby incorporated by reference in full, is to adjust the pH of the condensate to within about one pH unit of that of the brine concentrate. This solution is further described in U.S. Pat. Nos. 4,522,728, and 4,615,808 also issued to Gallup et al, both patents hereby incorporated by reference in full.

However, it has been found that merely acidifying the condensate does not solve all the problems associated with using the condensate to dilute the brine concentrate. Another problem is caused by the high sulfide ion concentration in the condensate. Metal sulfides do not precipitate from the brine concentrate in normal operation. However, contacting the metal ion-containing brine concentrate with an ammonium sulfide-containing condensate will produce metal sulfides. The nearly insoluble metal sulfides will then precipitate out of solution, causing system upsets. Therefore, sulfide concentration of the condensate can potentially cause a new problem by precipitating metal sulfides from the brine concentrates.

A seeming solution to the second problem is to contact the condensate with air to oxidize the sulfide ion. However, allowing the condensate to contact air to oxidize sulfide causes a further problem. When the condensate is left in a pond, or the like, a substantial concentration of oxygen dissolves in the condensate, causing the condensate to become very corrosive to the interior of the pipes in the geothermal plant. Such a corrosive solution is incompatible with an acceptably long service life in a geothermal plant.

In summary then, although condensate could advantageously be used to dilute a brine concentrate to prevent soluble salts from precipitating, before a geothermal plant operator can use condensate three problems must be overcome. First, the pH of the condensate, which is different from the brine concentrate, must be corrected. Second, the high concentration of sulfide ion in the condensate must be reduced. Third, the condensate must not be allowed to dissolve oxygen. All three problems must be solved before the operator can mix the condensate with the brine concentrate to produce an injection stream without causing system upsets. If the operator can produce an injection stream, he can then inject it into the earth, disposing of the brine concentrate, the condensate, and the dissolved salts It would be advantageous to have a method of treating the condensate so it could be added to the brine concentrate. Then it could be added to reduce the concentration of soluble salts in the brine concentrate solution. Such a method would allow one to add the condensate to the brine without upsetting the system or corroding the pipes.

SUMMARY OF THE INVENTION

This invention provides a method for disposing of a brine concentrate and a condensate derived from the same geothermal brine source. The pH of the condensate is adjusted toward the pH of the brine concentrate.

Then the condensate is contacted with air for a period of time sufficient to oxidize a substantial portion of the sulfide ion originally present in the condensate to sulfate, while allowing only low levels of oxygen to dissolve in the condensate. The oxidized steam condensate is then mixed with a brine concentrate prior to injection into the earth.

In a preferred embodiment, the pH of the condensate is adjusted to within two pH units of a brine concentrate. The pH-adjusted condensate then contacts air just long enough to oxidize the sulfide ion to sulfate ion, but not long enough to increase the concentration of oxygen in the solution. Ideally, the air contacts the condensate between about 2 to 20 hours. An injection stream is produced by mixing the oxidized condensate with the brine concentrate following which the injection stream is injected into the earth.

DETAILED DESCRIPTION OF THE INVENTION

A geothermal brine is extracted from a subterranean formation at a temperature between about 400° F. and 600° F., usually between 350° F. and 550° F., and a pressure between about 200 and 600 psig, usually between about 300 and 500 psig. The geothermal brine is flashed to produce steam and a brine concentrate having a greater total dissolved solids content than the geothermal brine. Although the steam powers a turbine to generate electricity, the operator must dispose of the brine concentrate.

The brine concentrate, at a pH between about 6.5 and 4.5, usually between about 5.0 and 6.0, is normally injected into the earth. Usually, after silica and other agents that can plug injection wells have been removed, by a clarifying process such as shown in U.S. Pat. No. 4,615,808. The temperature of the brine concentrate after flashing is usually between about 150° F. and 250° F., preferably about 210° F. to 235° F. The high concentration of total dissolved solids in the brine concentrate typically results in a complex solution. An example of a complex brine concentrate after flashing at a commercial facility in the Salton Sea is shown in Table 1. The complex solution represented by Table 1 contains many components at nearly their saturation concentrations. Such a complex solution is extremely sensitive to the concentrations of all components. If anything is added to the complex solution, it may upset the delicate balance, causing massive precipitations of components from the solution. Normally such components are not precipitated. Thus, if anything is to be added to the brine concentrate, it must be carefully matched with the brine concentrate to avoid causing precipitations.

TABLE 1

| Typical Composition of Salton Sea Brine Concentrate | | | | | |
|---|---|---|---|---|---|
| Analyte | mg/l | ppmw | Analyte | mg/l | ppmw |
| Ag | 0.1 | 0.1 | Mg | 115.0 | 100.0 |
| Al | 3.4 | 3.0 | Mn | 870.0 | 760.0 |
| As | 16.0 | 14.0 | Mo | <0.01 | <0.01 |
| Au | <0.02 | <0.017 | Na | 67000.0 | 58500.0 |
| B | 390.0 | 340.0 | Ni | <0.2 | <0.17 |
| Ba | 137.0 | 120.0 | $NH_4^+$ | 360.0 | 300.0 |
| Be | <0.01 | <0.01 | Pb | 79.0 | 69.0 |
| Ca | 31500.0 | 27500.0 | Pd | <0.02 | <0.02 |
| Cd | 1.8 | 1.6 | Pt | <0.02 | <0.02 |
| $Cl^-$ | 180,600 | 150,500.0 | Rb | 96.0 | 84.0 |
| Co | <0.02 | <0.02 | Sb | 0.9 | 0.8 |
| Cr | 0.05 | 0.04 | Se | <0.02 | <0.02 |
| Cs | 0.05 | 0.04 | $Si(SiO_2)$ | 88 (188) | 77 (165) |
| Cu | 2.4 | 2.1 | Sn | <0.01 | <0.001 |

TABLE 1-continued

| Typical Composition of Salton Sea Brine Concentrate | | | | | |
|---|---|---|---|---|---|
| Analyte | mg/l | ppmw | Analyte | mg/l | ppmw |
| Fe | 610.0 | 530.0 | Sr | 480.0 | 420.0 |
| Hg | <0.001 | <0.001 | $SO_4^{-2}$ | 120.0 | 100.0 |
| K | 15300.0 | 13200.0 | Ti | <1.0 | <0.9 |
| Li | 204.0 | 178.0 | V | <0.4 | <0.9 |
|  |  |  | Zn | 340.0 | 300.0 |
| pH | 5.5 |  | Br | 120.0 | 100.0 |
|  |  |  | F | 23.0 | 19.0 |
|  |  |  | I | 26.0 | 22.0 |

TABLE 2

| Typical Salton Sea Steam Condensate Analysis | | | |
|---|---|---|---|
| Analyte | mg/kg | Analyte | mg/kg |
| CATIONS | | | |
| Ag | <0.01 | Li | <0.01 |
| Al | <0.05 | Mg | <0.01 |
| As | <0.001 | Mn | <0.005 |
| B | 2.5 | Mo | <0.002 |
| Ba | <0.005 | Na | 0.09 |
| Be | <0.002 | Ni | <0.04 |
| Ca | 0.05 | Pb | <0.05 |
| Cd | 0.01 | Sb | <0.05 |
| Co | <0.02 | Se | <0.002 |
| Cr | <0.01 | Si | <0.03 |
| Cu | 0.075 | Sr | <0.04 |
| Fe | 0.01 | Ti | <0.01 |
| Hg | 0.0005 | V | <0.01 |
| K | 0.03 | Zn | 0.02 |
| ANIONS | | | |
| $Cl^-$ | 1.0 | $OH^-$ | 50 |
| $CN^-$ | <0.01 | $S^{-2}$ | 35 |
| $CO_3^{-2}$ | 360 | | |
| MISCELLANEOUS | | | |
| TDS* | 80 | $NH_3^+$ | 270 |
| pH | 9.2 | | |

*TDS means Total Dissolved Solids

When the steam in the commercial geothermal facility at the Salton Sea producing the brine concentrate of Table 1 is condensed, the condensate typically has the composition shown in Table 2. Although an analysis of any particular condensate may be different from that shown, the major components identified will usually be present in most condensates. The steam flashed from the brine includes not only water, but also ammonia and hydrogen sulfide, two other volatile gases present in geothermal brines. The ammonia and hydrogen sulfide react to form ammonium sulfide as the steam cools and condenses following energy production (i.e., during powering a steam turbine). The temperature of the condensate is typically less than 200° F., preferably less than about 150° F., and most preferably about 120° F. The condensate typically contains ammonium sulfide in a concentration between about 35 and 100 ppmw, usually between about 50 and 85 ppmw. The condensate typically has a pH greater than about 8.0, usually between about 8.5 and 9.5. Although the pH of the condensate is dominated by the concentration of ammonium sulfate, other components in the condensate, for example, $CN^-$ and $CO_3^{-2}$, also affect the pH. Therefore, the pH of the condensate may not always exactly correspond to the pH of a pure ammonium sulfide aqueous solution of identical concentration. The condensate of Table 2 has a considerably higher pH than the brine concentrate of Table 1.

The pH of the condensate is typically adjusted to within two pH units, preferably one pH unit, of that of the brine concentrate. Added acid reduces the pH of the condensate. This mitigates the problem caused by the pH incompatibility of the brine concentrate and the condensate. Preferred acids for addition include protic mineral acids, for example, hydrochloric, sulfuric, nitric, phosphoric, hydrofluoric, and the like, although organic acids, for example, acetic and formic work as well. For compatablity and economic reasons, hydrochloric acid is usually preferred to adjust the pH of the condensate.

After adjusting the pH of the condensate, the operator must reduce the sulfide concentration. This is accomplished by contacting the pH-adjusted condensate with air in a holding tank for a period of time sufficient to oxidize a substantial portion, preferably most, of the sulfide ($S^{-2}$) to sulfate ($SO_4^{-2}$). Usually, it is preferred to have at least about 70%, preferably at least about 85%, of the sulfide ion originally present oxidized to sulfate. Preferably, the tank holds the condensate exposed to air between about 2 and 20 hours, more preferably between 4 and 16 hours, and most preferably between 6 and 10 hours. However, the condensate cannot be contacted with the air long enough for a substantial concentration of oxygen to dissolve in the condensate.

Although a volume of the condensate could be placed in the holding tank for the desired period of time and then added as a whole to the brine concentrate, the preferred method is continuously filling the holding tank and allowing the condensate to flow through the holding tank. It is preferred that the holding tank is a vessel where condensate is added at one end and removed through another. For example, assuming that about 100 gallons of condensate is added to the holding tank per hour, if a holding tank has a capacity of 800 gallons and brine is removed from the tank at about 100 gallons per hour, the average period of time the brine contacts the air is eight hours.

Air provides the oxygen required to oxidized sulfide to sulfate. However, as the concentration of sulfide approaches 1 ppmw, oxygen starts to dissolve in the condensate. Oxygen-rich condensate added to the brine concentrate results in a corrosive injection stream. The undesirable corrosive effects of oxygen are avoided by maintaining condensate exposure to the air only long enough to oxidize most of the sulfide to sulfate. Although the condensate remains in the holding tank for a residence time long enough for most of the sulfide to be oxidized, only a small concentration of oxygen dissolves in the solution in that period of time. The short exposure time allows no more than about 1 ppmw, more preferably no more than 0.1 ppmw, and most preferably no more than 0.01 ppmw of oxygen to dissolve in the condensate. The residence time should be sufficiently long to reduce the concentration of sulfide to less than 5 ppmw, preferably less than 1 ppmw, but, preferably, no longer.

The condensate in the tank forms an air-liquid interface. Oxygen crosses this interface to go into solution, and hydrogen sulfide crosses this interface to leave the condensate. Some hydrogen sulfide escape into the atmosphere is usually preferred. Hydrogen sulfide escape into the atmosphere is normally avoided because hydrogen sulfide is noxious. However, in this case, although the concentration of hydrogen sulfide lost to the air is enough to prevent troublesome concentrations of sulfate in the injection stream, the amount released into the atmosphere is so small that it poses no environmental problem.

The brine concentrate contains some quantity of naturally occurring radioactive materials (NORMs). It is desirable to keep NORMs either as dissolved components in solution or dispersed as entrained small particles for subsequent injection into the ground. Since the bulk of NORMs is radium-contaminated barium sulfate, as more sulfate is produced in the brine concentrate, more NORMs precipitate. The condensate may contain 20 ppmw sulfide or more (See Table 2) which, when oxidized, produces about 60 ppmw sulfate in the condensate. Therefore, removal of some hydrogen sulfide from the condensate prevents the precipitation of NORMs.

The oxidized condensate can then be added to the brine concentrate to produce the injection stream. It is preferred that the concentration of sulfate in the oxidized condensate not exceed 300 ppmw, the concentration of oxygen be less than 0.01 ppmw, and the concentration of sulfide be less than 5.0 ppmw. More preferably the oxidized stream contains no more than 100 ppmw sulfate, no more than 0.001 ppmw oxygen, and no more than 1.0 ppmw sulfide.

The pH-adjusted and oxidized condensate is mixed with the brine concentrate to produce an injection stream. Although the mixing step can be located anywhere in the brine concentrate processing flow, it is preferred to mix the two components before one or more clarifiers. The injection stream contains silica which is removed at the clarifiers before injection.

The injection stream remains free of precipitated components caused by pH incompatibility or by formation of metal sulfides. The injection stream usually contains more than about 50% brine concentrate and less than about 50% condensate, more usually more than about 70% brine concentrate and less than about 30% condensate. The injection stream usually contains no more than about 3 ppmw sulfide, no more than about 250 ppmw sulfate, no more than about 0.01 ppmw oxygen, and no more than about 500,000 ppmw soluble salt components. More preferably the injection stream contains no more than about 1 ppmw sulfide, no more than about 100 ppmw sulfate, no more than about 0.001 ppmw oxygen, and no more than about 300,000 ppmw soluble salt components. As used herein, soluble salt components refers to dissolved solids remaining after all dispersed solids have been removed from a solution. The injection stream is then injected into the earth. Less sulfides, NORMs-containing sulfates, and salts precipitate than if the liquid steam were not diluted. The injection stream of the invention does not corrode the pipes in the geothermal facility.

Although this invention has been primarily described in conjunction with references to the preferred embodiments thereof, it is evident that many alternatives, modifications and variations will be apparent to those skilled in the art in light of the foregoing description. Accordingly, it is intended that the spirit and scope of the appended claims embrace all such alternatives, modifications and variations.

What is claimed is:

1. A method for disposing of ligaid brine concentrate and sulfide-containing steam condensate derived from the same geothermal brine source comprising:
   adjusting the pH of the condensate to within 2 pH units of the liquid brine concentrate;
   contacting the pH-adjusted condensate with air for a period of time sufficient to oxidize a substantial portion of the sulfide ion originally present in the condensate to sulfate, while allowing no more than 1 ppmw oxygen to dissolve in the condensate;

mixing the oxidized steam condensate with the liquid brine concentrate to prevent precipitation of soluble salts in said concentrate; and injecting the mixture into the earth.

2. The method of claim 1 wherein the adjusting step (4) comprises adjusting the pH of the condensate to within one pH unit of the brine concentrate.

3. The method of claim 2 wherein the adjusting in step (4) comprises adding a mineral acid to the condensate.

4. The method of claim 3 wherein the mineral acid is hydrochloric acid.

5. A method for disposing of a waste brine concentrate produced by flashing a geothermal brine at a geothermal power plant comprising:

(1) producing a liquid brine concentrate and a gaseous phase from a geothermal brine;

(2) extracting energy from the gaseous phase;

(3) thereafter, condensing the gaseous phase into a liquid condensate;

(4) adjusting the pH of the condensate to within 2 pH units of the brine concentrate;

(5) exposing the pH-adjusted condensate to air for a time sufficient to oxidize a substantial portion of the sulfide ion originally present in the condensate to sulfate ion, but not long enough for the concentration of oxygen to exceed 1.0 ppmw, producing an oxidized condensate;

(6) mixing the liquid brine concentrate with the oxidized condensate to prevent precipitation of soluble salts in said concentrate, and (7) injecting the mixture into the earth.

6. The method of claim 5 wherein the step (1) further comprises producing the brine concentrate and the gaseous phase from the geothermal brine by reducing the temperature of the brine from at least 400° F. to less than 250° F.

7. The method of claim 5 wherein the exposing step (5) comprises contacting the condensate with air in a tank for between 2 and 20 hours.

8. The method of claim 7 wherein the exposing step (5) reduces the sulfide concentration of the pH-adjusted condensate to no more than 5.0 ppmw sulfide.

9. The method of claim 5 wherein the exposing step (5) reduces the sulfide concentration of the pH-adjusted condensate to no more than 5.0 ppmw sulfide.

10. The method of claim 9 wherein the sulfide concentration of the injection stream does not exceed 3 ppmw.

11. The method of claim 5 wherein the exposing in step (5) dissolves no more than 0.1 ppmw oxygen in the condensate.

12. The method of claim 5 wherein the sulfate concentration of the injection stream does not exceed 250 ppmw.

13. The method of claim 5 wherein the injection stream contains no more than 1.0 ppmw sulfide, 100 ppmw sulfate, 0.01 ppmw oxygen, and 300,000 ppmw soluble salts.

14. A method for reducing the amount of soluble salt precipitated from a waste geothermal brine concentrate comprising:

oxidizing a steam condensate, having a pH within two pH units of the pH of a brine concentrate, sufficiently to minimize the concentrations of sulfide, sulfate, and oxygen in the liquid condensate, producing an oxidized condensate, wherein no more than 1.0 ppmw of oxygen is dissolved in the oxidized condensate;

mixing the oxidized condensate and the brine concentrate to prevent precipitation of soluble salts in said concentrate; and injecting the mixture into the earth.

15. The method of claim 14 wherein the brine concentrate contains 300,000 ppmw of soluble salts.

16. The method of claim 15 wherein the oxidized condensate contains no more than 300 ppmw sulfate.

17. The method of claim 15 wherein the oxidized condensate contains no more than 5.0 ppmw sulfide.

18. The method of claim 15 wherein the oxidized condensate contains no more than 0.1 ppmw oxygen.

19. The method of claim 14 wherein the oxidized condensate contains no more than 5.0 ppmw sulfide.

20. The method of claim 19 wherein the oxidized condensate contains no more than 300 ppmw sulfate.

21. The method of claim 19 wherein the oxidized condensate contains no more than 0.1 ppmw oxygen.

22. The method of claim 14 wherein the oxidized condensate contains no more than 300 ppmw sulfate.

23. The method of claim 22 wherein the oxidized condensate contains no more than 0.1 ppmw oxygen.

24. The method of claim 23 wherein the oxidized condensate contains no more than 300 ppmw sulfate.

* * * * *